T. W. TYLER.
Churn Dasher.

No. 80,685. Patented Aug. 4, 1868.

Witnesses:

Inventor:
T. W. Tyler
per Munn &
Attys.

United States Patent Office.

T. W. TYLER, OF CORRY, PENNSYLVANIA.

Letters Patent No. 80,685, dated August 4, 1868.

IMPROVEMENT IN CHURN-DASHER.

*The Schedule referred to in these Letters Patent and making part of the same.*

TO ALL WHOM IT MAY CONCERN:

Be it known that I, T. W. TYLER, of Corry, in the county of Erie, and State of Pennsylvania, have invented a new and useful Improvement in Churn-Dashers; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved churn-dasher, which shall be so constructed as to bring the butter quicker, with less labor, and in larger quantities than the dashers now in use, and which shall at the same time be easily washed and cleaned; and it consists in the knife-wheels, constructed and operating as hereinafter more fully described.

A is the body, and B is the cover of the churn, about the construction of which parts there is nothing new.

C is the dasher-handle, which is made of wood, and upon the lower end of which is formed a long round tenon, D, which may be made of wood or metal, but which I prefer to make of galvanized iron, so that it may not corrode.

E are inclined radial knives, the inner ends of which are attached to hubs F, of galvanized iron or other non-corrosive substance.

The outer ends of the knives E are attached to a circular band or ring, G, so as to keep them in their proper relative positions.

Figure 1:
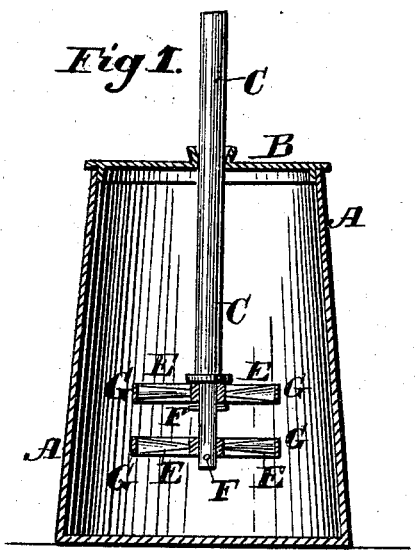
Figure 1 is a vertical section of my improved churn-dasher, showing it in place in a churn.
Figure 2:
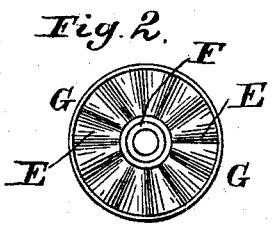
Figure 2 is a top view of one of the knife-wheels.
Figure 3:
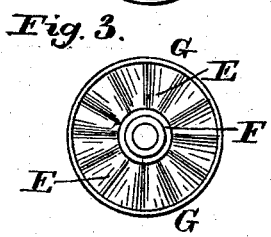
Figure 3 is a top view of the other knife-wheel.

The knives E are made to incline in one direction in one of the wheels, and in the other direction in the other wheel, as shown in figs. 1, 2, and 3, so that as the dasher is moved up and down through the cream, the two wheels may revolve in opposite directions, the one wheel throwing the cream into currents, which the other wheel intercepts and breaks up, the knives at the same time cutting the cream quicker and more effectually than can be done by any other form of dasher.

The knife-wheels, with the exception of the hubs, I prefer to make of tin, so as to be light, and at the same time not liable to be corroded by the action of the cream.

The hubs F are secured to the long tenon D by spring-pins or other convenient means, so that they may be readily detached and removed, for convenience in washing and cleaning them.

I claim as new, and desire to secure by Letters Patent—

The knife-wheels F E G, constructed and operating substantially as herein shown and described, in combination with the long tenon D of the dasher-handle C, as and for the purpose set forth.

T. W. TYLER.

Witnesses:
JOHN A. WILLIAMS,
W. E. GARRETT.